United States Patent
Hayashishita et al.

(10) Patent No.: US 8,818,153 B2
(45) Date of Patent: Aug. 26, 2014

(54) OPTO-ELECTRO HYBRID CABLE HAVING ELECTRONIC WIRES AND OPTICAL FIBERS

(75) Inventors: Tatsunori Hayashishita, Aomori (JP); Hirokazu Takahashi, Tochigi (JP); Masamichi Niwata, Aomori (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 154 days.

(21) Appl. No.: 13/164,905

(22) Filed: Jun. 21, 2011

(65) Prior Publication Data

US 2011/0311191 A1    Dec. 22, 2011

(30) Foreign Application Priority Data

Jun. 22, 2010  (JP) ................................. 2010-141378
Jun. 22, 2010  (JP) ................................. 2010-141401

(51) Int. Cl.
*G02B 6/00*   (2006.01)
*G02B 6/28*   (2006.01)
*G02B 6/44*   (2006.01)

(52) U.S. Cl.
CPC ................................ *G02B 6/446* (2013.01); *G02B 6/4432* (2013.01)
USPC ........................................................ 385/100

(58) Field of Classification Search
USPC .......................................... 385/100–109, 147
See application file for complete search history.

(56) References Cited

U.S. PATENT DOCUMENTS

| 4,199,224 A | | 4/1980 | Oestreich |
| 4,371,234 A | * | 2/1983 | Parfree et al. ................. 385/103 |
| 4,645,868 A | * | 2/1987 | Suzuki ........................ 174/117 F |
| 4,723,832 A | | 2/1988 | Okazato et al. |

FOREIGN PATENT DOCUMENTS

| CN | 85 1 08068 A | | 12/1986 | |
| CN | 85101824 A | | 1/1987 | |
| CN | 1564269 A | | 1/2005 | |
| CN | 2738364 Y | | 11/2005 | |
| CN | 201011626 Y | | 1/2008 | |
| JP | S51-65646 | | 6/1976 | |
| JP | S54-041745 A | | 4/1979 | |
| JP | 60-109216 U | | 7/1985 | |
| JP | 62-135309 U | | 8/1987 | |
| JP | 05074228 A | * | 3/1993 | ................ 385/100 |
| JP | 2006-065215 A | | 3/2006 | |

OTHER PUBLICATIONS

Chinese Office Action of corresponding Chinese Patent Application No. 201110173598.0, dated on Dec. 4, 2012.
Chinese Office Action of the corresponding Chinese Patent Application No. 201110173598.0, dated on Aug. 7, 2013.
Japanese office action of the corresponding Japanese Application No. JP2010-141401 dated Mar. 4, 2014.
Japanese office action of the corresponding Japanese Application No. JP2010-141378 dated Mar. 4, 2014.

* cited by examiner

*Primary Examiner* — Akm Enayet Ullah
(74) *Attorney, Agent, or Firm* — Global IP Counselors, LLP

(57) ABSTRACT

According to the opto-electro hybrid cable of the invention, it is possible to prevent the excessive lateral pressure from being applied to the optical fibers from the electronic wires and the excessive bending or twisting from being generated. In addition, it is possible to increase the tensile strength and to prevent the excessive tension from being applied to the optical fibers, so that it is possible to keep the favorable transmission characteristics.

10 Claims, 2 Drawing Sheets

ОРТО-ELECTRO HYBRID CABLE HAVING ELECTRONIC WIRES AND OPTICAL FIBERS

CROSS-REFERENCE TO RELATED APPLICATIONS

This application claims priority to Japanese Patent Application No. 2010-141378, filed on Jun. 22, 2010 and Japanese Patent Application No. 2010-141401, filed on Jun. 22, 2010. The entire disclosures of Japanese Patent Application No. 2010-141378 and Japanese Patent Application No. 2010-141401 are hereby incorporated herein by reference.

BACKGROUND

1. Field of the Invention

The present invention relates to an opto-electro hybrid cable having electronic wires and optical fibers.

2. Background Information

In electronic devices such as medical devices, portable terminals, small video camera, personal computers and PDA (Personal Digital Assistant), as the functions thereof are highly-developed, the high-speed communication is needed. Accordingly, an opto-electro hybrid cable having combined electronic wires and optical fibers is used.

An opto-electro hybrid cable has been known in which a buffer layer is provided on an outer circumference of the optical fibers, a sheath is provided on an outer circumference of the buffer layer, the electronic wires are arranged on an outer side of the sheath and an outer cover is provided on an outer circumference of the electronic wires (see JP-U-62-135309, for instance).

In addition, an opto-electro hybrid cable has been also known in which a plurality of optical fibers is arranged at an interval on an outer circumference of a core, a partition sheet covering the core and the optical fibers is provided on an outer side of the fibers, electronic wires are arranged at positions corresponding to the intervals of the fibers on an outer side of the partition sheet and an outer cover is provided on an outer side of the electrical wires (see JP-U-60-109216, for instance).

SUMMARY

However, transmission loss may be increased in the optical fibers configuring the opto-electro hybrid cable due to excessive bending or twisting. When the opto-electro hybrid cable is bent, the optical fibers may be applied with lateral pressure from the electrical wires arranged on the outer circumference. In this case, the transmission loss may be increased.

Accordingly, when the partition sheet is only to be provided to divide the accommodating space between the optical fibers and the electronic wires, as the cable of the second patent document, it is difficult to sufficiently suppress the lateral pressure, which is applied to the optical fibers from the electronic wires, and to thus reduce the increase in the transmission loss. Also, even when the sheath is provided to divide the accommodating space between the optical fibers and the electronic wires, as the cable of the first patent document, it is difficult to sufficiently suppress the lateral pressure, which is applied to the optical fibers from the electronic wires when bending the cable to a small diameter (a diameter of about 30 mm), and to thus reduce the increase in the transmission loss.

An object of the invention is to provide an opto-electro hybrid cable capable of suppressing external force from being applied to optical fibers and thus keeping favorable transmission characteristics of the optical fibers.

According to a first aspect of an illustrative embodiment of the invention, an opto-electro hybrid cable is an opto-electro hybrid cable having a plurality of optical fibers and a plurality of electronic wires inside a sheath wherein the optical fibers are accommodated in a tube having Shore D hardness of 65 or greater, the optical fibers are circumferentially disposed to contact an inner circumference of the tube and the electronic wires are arranged around the optical fibers.

According to a second aspect of an illustrative embodiment of the invention, the tube may have a thickness of about 0.05 mm or larger.

According to a third aspect of an illustrative embodiment of the invention, tension members may be disposed in a gap formed at a central portion in the tube.

According to a fourth aspect of an illustrative embodiment of the invention, the tension members may be accommodated in an accommodation density of 5800 denier/$mm^2$ or greater.

According to a fifth aspect of an illustrative embodiment of the invention, fillers may be accommodated together with the tension members and an accommodation density of the tension members and the fillers may be 7500 denier/$mm^2$ or greater.

According to a sixth aspect of an illustrative embodiment of the invention, the tube may be formed of tetrafluoroethylene-ethylene copolymer resin.

According to the opto-electro hybrid cable of the invention, it is possible to prevent the excessive lateral pressure from being applied to the optical fibers from the electronic wires and the excessive bending or twisting from being generated. In addition, it is possible to increase the tensile strength and to prevent the excessive tension from being applied to the optical fibers, so that it is possible to keep the favorable transmission characteristics.

DETAILED DESCRIPTION OF EMBODIMENTS

Hereinafter, illustrative embodiments of the opto-electro hybrid cable of the invention will be described with reference to the drawings.
(First Aspect)

Figure 1:
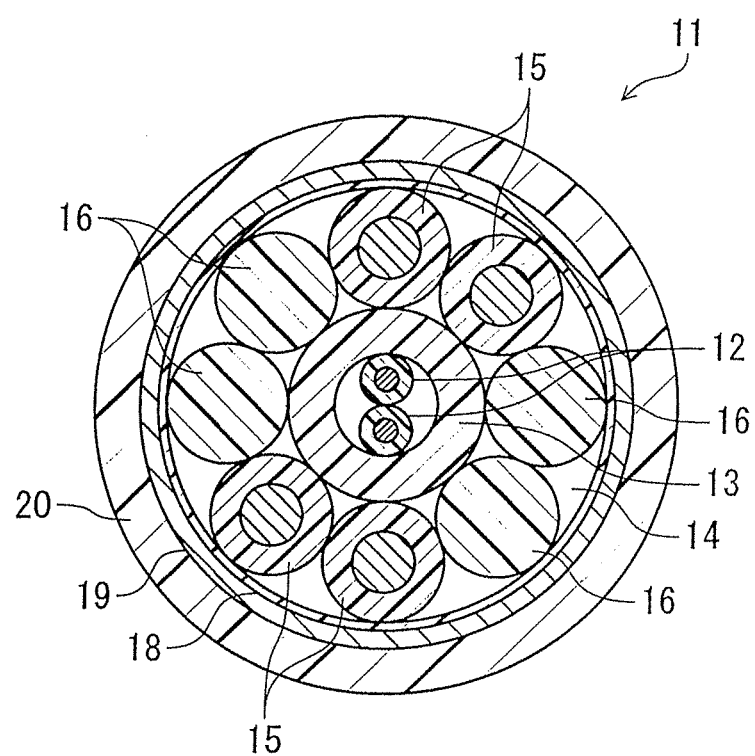
FIG. 1 is a sectional view showing an example of an opto-electro hybrid cable according to a first aspect of an illustrative embodiment of the invention.

As shown in FIG. 1, an opto-electro hybrid cable 11 has a plurality of resin coated optical fibers (optical fibers) 12 and a plurality of electronic wires 15 inside a sheath 20 that is the outermost layer. The plurality of resin coated optical fibers 12 is accommodated in a protection tube (tube) 13 that is arranged at a sectional center of the opto-electro hybrid cable 11.

The plurality of electronic wires 15 and a plurality of fillers 16 are disposed in an accommodation part 14 that is formed inside the sheath 20 and outside the protection tube 13. The electronic wires 15 include a twisted-pair cable, a coaxial cable or insulated wire, and the like and are cables having AWG 20 to 46 in accordance with the standard of AWG (American Wire Gauge), for example. In this illustrative embodiment, two of the four electronic wires 15 are signal lines and two electronic wires are power lines. In addition, a wrapping tape 18, a shield layer 19 and the sheath 20 are sequentially provided around the accommodation part 14. A thickness of the accommodation part 14 (a distance between the outer circumference of the protection tube 13 and the inner circumference of the wrapping tape 18) is preferably equal to or slightly larger than outer diameters of the electronic wire 15 and the filler 16.

Each of the resin coated optical fibers 12 accommodated in the protection tube 13 includes a glass fiber configured of core and clad and having a diameter of about 0.125 mm and a cover layer formed on a periphery of the glass fiber, configured of ultraviolet cure resin and having an outer diameter of about 0.25 mm. In addition, the resin coated optical fiber 12 having a further cover layer and an outer diameter of about 0.9 mm, or an optical fiber cord in which the resin coated optical fiber 12 is further covered by a tensile strength fiber and a cover layer may be used.

As the resin coated optical fiber 12, a plastic clad fiber (H-PCF) that includes a glass core and a high-hardness plastic clad, is highly resistant to bending (kink) and is thus not broken well, a plastic fiber having plastic core and clad may be also used.

When the opto-electro hybrid cable 11 is used without being bent to a small diameter, such as CCD cord that is a medical sensor cord, the glass fiber can be used. When the opto-electro hybrid cable is used with being bent to a small diameter, such as USB (Universal Serial Bus) cable or HDMI (High-Definition Multimedia Interface) cable, it is preferable to use the hard plastic clad fiber.

In the protection tube 13, the resin coated optical fibers 12 are accommodated to abut on the inner circumference of the protection tube 13. The two to four resin coated optical fibers 12 are provided and the resin coated optical fibers 12 are contacted to each other and all the resin coated optical fibers 12 are inscribed in the protection tube 13, so that positions of the respective resin coated optical fibers 12 are diametrically fixed, when seen from the sectional view of the protection tube 13, which is shown in FIG. 1. When the resin coated optical fibers 12 are twisted loosely (with a long pitch), the positions thereof are also fixed in a peripheral direction of the protection tube 13, when seen from the sectional view of the protection tube 13, which is shown in FIG. 1. It is necessary for the protection tube 13 to have hardness to some extent so as to protect the resin coated optical fibers 12 from the external force without using another reinforcement member. Accordingly, the protection tube 13 having Shore D hardness of 65 or greater is used to securely protect the accommodated resin coated optical fibers 12. In addition, it is also necessary for the protection tube 13 to have a function of buffer material absorbing the lateral pressure applied from the electronic wires 15 and the like. Regarding this, the protection tube 13 has a thickness of 0.05 mm or greater and a function of favorably absorbing the lateral pressure applied from the electronic wires 15 and the like. In this illustrative embodiment, the thickness of the protection tube 13 is about 0.25 mm. In addition, the outer diameter of the protection tube 13 is about 1.0 mm, for example. The thicker the protection tube 13, the larger the outer diameter of the cable. Accordingly, the thickness up to about 0.8 mm is practical.

For the material of the protection tube 13, tetrafluoroethylene-ethylene copolymer (EFTE) resin, which is resin material having excellent mechanical strength, is preferably used.

The protection tube 13 is formed to cover the resin coated optical fibers 12 by extruding and covering the resin around the arranged resin coated optical fibers 12.

The electronic wire 15, which is the signal line, has a conductor having an outer diameter of about 0.30 mm, which is formed by twisting seven wires, each of which is configured of annealed copper wire or copper alloy wire having tin plated thereto and has an outer diameter of about 0.1 mm. The conductor is covered by an insulation sheath having a thickness of about 0.14 mm, so that the electronic wire 15 having an outer diameter of about 0.58 mm is obtained. In addition, the electronic wire 15, which is the power line, has a conductor having an outer diameter of about 0.38 mm, which is formed by twisting seven wires, each of which is configured of annealed copper wire or copper alloy wire having tin plated thereto and has an outer diameter of about 0.127 mm. The conductor is covered by an insulation sheath having a thickness of about 0.1 mm, so that the electronic wire 15 having an outer diameter of about 0.58 mm is obtained. The signal lines and the power lines are provided two by two, respectively. As the material of the sheath of the electronic wire 15, tetrafluoroethylene-perfluoro alkyl vinyl ether copolymer (PFA) resin having excellent heat resistance, chemical resistance, non-adhesiveness, self-lubricating property and the like is preferably used for both the signal line and the power line.

For the wrapping tape 18, a resin tape formed of polyethylene terephthalate (PET) resin having excellent heat resistance, wear resistance and the like is used. An inner diameter of a part to which the wrapping tape 18 is wound is about 2.2 mm, for example. In the meantime, for the wrapping tape 18, a paper tape or resin tape formed of polytetrafluoroethylene (PTFE) resin may be also used.

The shield layer 19 is formed by braiding copper alloy wires having tin plated thereto and an outer diameter of several tens of μm (for example, outer diameter: about 0.03 mm or 0.04 mm) and has a thickness of about 0.1 mm. In the meantime, for the shield layer 19, the copper alloy wire may be spirally wound or a metal resin tape having copper foil or aluminum foil formed on a resin tape of polyethylene terephthalate (PET) resin may be wrapped.

The sheath 20 is formed of polyvinyl chloride (PVC), polyolefin-based resin and the like. The non-halogen polyolefin-based resin includes ethylene-vinyl acetate copolymer (EVA), polyethylene (PE), and a mixture of elastomers such as styrene ethylene butylene styrene block copolymer (SEBS). In addition, polyethylene (PE) having weather resistance agent, antioxidant and anti-aging agent added thereto may be also used. In the meantime, the sheath 20 for which polyethylene (PE) is used may be non-flame-retardant polyethylene that does not include flame retardant. The sheath 20 has a thickness of about 0.1 to 0.5 mm and an outer diameter of 2 to 10 mm, for example, a thickness of about 0.25 mm and an outer diameter of about 3.0 mm to 7.0 mm.

According to the opto-electro hybrid cable 11 configured as described above, the resin coated optical fibers 12 are accommodated in the protection tube 13 having Shore D hardness of 65 or greater and are also disposed to abut on the inner circumference of the protection tube 13. Accordingly, it is possible to prevent the excessive lateral pressure from being applied to the resin coated optical fibers 12 from the electronic wires 15 and the like and the excessive bending or twisting from being generated. In addition, the tensile strength is also increased, so that it is possible to prevent the excessive tension from being applied to the resin coated optical fibers 12.

Like this, compared to the configuration in which the reinforcement member such as tensile strength member is provided in the protection tube 13, it is possible to suppress the external force from being applied to the resin coated optical fibers 12 as much as possible, thereby keeping the favorable transmission characteristics.

In the above illustrative embodiment, the two resin coated optical fibers 12 are accommodated in the protection tube 12. However, the number of the resin coated optical fibers 12 is not limited to two. The resin coated optical fibers 12 may be disposed at positions that are somewhat deviated from the sectional center of the opto-electro hybrid cable 11. However, it is preferable to dispose the resin coated optical fibers 12 at the sectional center of the opto-electro hybrid cable 11.

In addition, the number, thickness and types of the electronic wires 15 and the fillers 16 are not limited to the above illustrative embodiment. In the above illustrative embodiment, the signal lines and power lines are distributed two by two and the fillers 16 are arranged therebetween, so that the section of the sheath 20 of the cable becomes circular. For the filler 16, a fiber having tensile strength below 2000 MPa such as rayon and nylon may be used. However, the fillers 16 may be omitted inasmuch as the section of the sheath 20 becomes circular even when only the electronic wires 15 are arranged without providing the fillers 16 in the accommodation part 14.

(Second Aspect)

Figure 2:
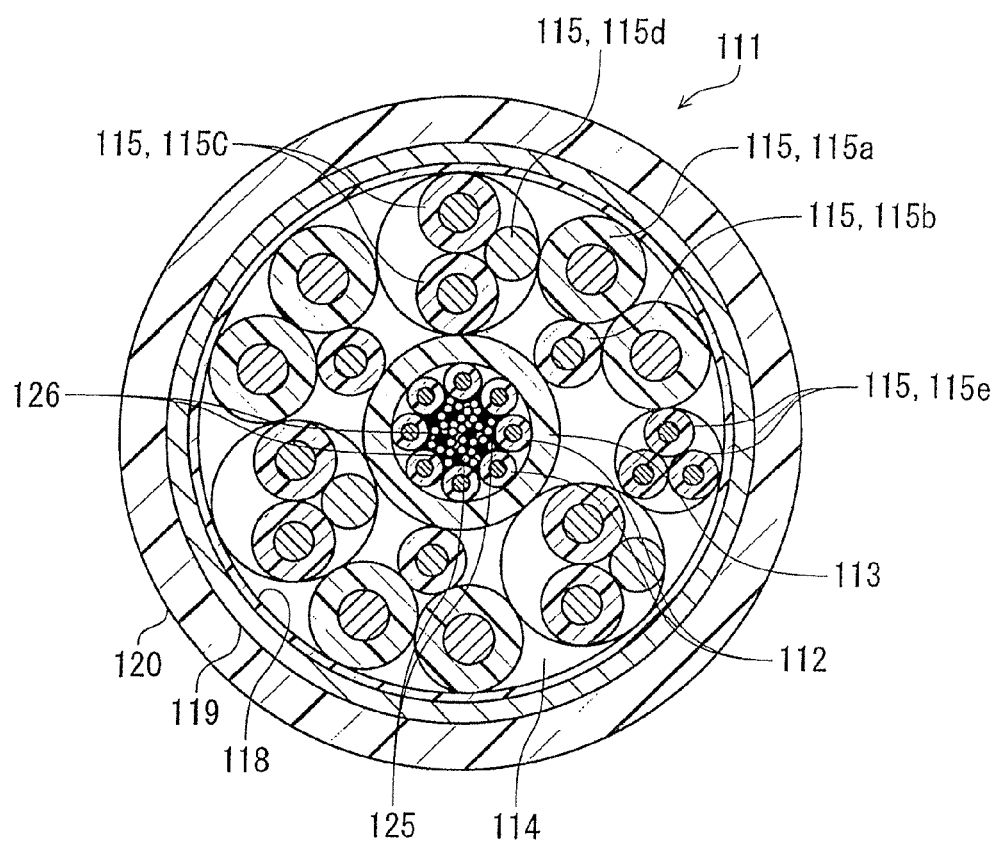
FIG. 2 is a sectional view showing an example of an opto-electro hybrid cable according to a second aspect of an illustrative embodiment of the invention.

As shown in FIG. 2, like the first aspect, an opto-electro hybrid cable 111 has a plurality of resin coated optical fibers (optical fibers) 112 and electronic wires 115 inside an sheath 120 that is the outermost layer. The plurality of resin coated optical fibers 112 is accommodated in a protection tube (tube) 113 that is arranged at the sectional center of the opto-electro hybrid cable 111.

An accommodation part 114 is formed inside the sheath 120 and outside the protection tube 113. The plurality of electronic wires 115 is disposed in the accommodation part 114. The electronic wires 115 include an insulated wire 115*a* having a large diameter, an insulated wire 115*b* of a small diameter, a twisted-pair cable having a pair of insulated wires 115*c* and a drain wire 115*d*, a plurality of coaxial cables 115*e* twisted each other, and the like. For example, the insulated wire is formed by twisting seven wires configured of annealed copper wires or copper alloy wires having tin plated thereto and covered by an sheath that is preferably made of tetrafluoro ethylene-perfluoro alkyl vinyl ether copolymer (PFA) resin having excellent heat resistance, chemical resistance, non-adhesiveness, self-lubricating property and the like. In the accommodation part 114, fillers made of fibers such as rayon, nylon and the like may be accommodated in gaps between the respective electronic wires 115. In the accommodation part 114, a tensile strength wire (tension member such as aramid fiber, not including steel wire) may be also accommodated in addition to the electronic wires. Also, a wrapping tape 118, a shield layer 119 and the outer cover 120 are sequentially provided around the accommodation part 114.

In the meantime, the resin coated optical fiber 112 is the same as the resin coated optical fiber 12 of the first aspect.

In the protection tube 113, the plurality of resin coated optical fibers 112 (eight resin coated optical fibers in this illustrative embodiment) is accommodated to abut on the inner circumference of the protection tube 113 without a gap as much as possible. The resin coated optical fibers 112 are preferably accommodated straightly without being twisted in the protection tube 113. If the resin coated optical fibers are twisted with a narrow pitch, the resin coated optical fibers are locally bent, so that the transmission loss may be increased.

In addition, tension members 125 are disposed in a space of the central part in the protection tube 113. Thereby, the resin coated optical fibers 112 are accommodated in the protection tube 113 with being sandwiched by the tension members 125 and the protection tube 113.

For the tension member 125, a fiber having tensile strength of 2000 MPa or greater, for example aramid fiber having tensile strength of 2920 MPa or greater is used.

The tension members 125 are accommodated in the gap of the protection tube 113 in an accommodation density of 5800 denier/mm$^2$ or greater.

In addition, fillers 126 having tensile strength lower than the tension members 125 may be accommodated in the gap of the protection tube 113 together with the tension members 125. The filler 126 is a fiber having tensile strength lower than 2000 MPa, and nylon fiber and the like is used, for example.

When the fillers 126 are accommodated in the gap of the protection tube 113 together with the tension members 125, the accommodation density of the tension members 125 and the fillers 126 with respect to the gap is preferably 7500 denier/mm$^2$ or greater.

For example, when the eight resin coated optical fibers 112 having a diameter of about 0.25 mm are accommodated in the protection tube 113 having an inner diameter of about 0.9 mm, the gap of the protection tube 113 is about 0.243 mm$^2$. When the tension members 125 having 1420 denier are accommodated in the gap of the protection tube 113, the accommodation density of the tension members 125 in the gap of the protection tube 113 is 5843 denier/mm$^2$. Alternatively, when the fillers 126 having 420 denier are inserted in the gap of the protection tube 113 and the tension members 125 and the fillers 126 having 1840 denier in total are thus accommodated in the gap of the protection tube 113, the accommodation density is 7572 denier/mm$^2$.

The protection tube 113 is formed to cover the resin coated optical fibers 112, the tension members 125 and the fillers 126 by arranging the resin coated optical fibers 112, the tension members 125 and the fillers 126 in a certain sectional shape and extruding and covering the resin around the same.

In the meantime, the structure and material of the protection tube 113 are the same as those of the protection tube 13 of the first aspect.

In addition, the wrapping tape 118, the shield layer 119 and the sheath 120 are the same as the wrapping tape 18, the shield layer 19 and the sheath 20 of the first aspect, respectively.

According to the opto-electro hybrid cable 111 configured as described above, the resin coated optical fibers 112 are accommodated in the protection tube 113 and are held by the protection tube 113 and the tension members 125 so as to abut on the inner circumference of the protection tube 113. Accordingly, it is possible to prevent the excessive lateral pressure from being applied to the resin coated optical fibers 112 from the electronic wires 115 and the like and the excessive bending or twisting from being generated. In addition, the tensile strength is also increased by the tension members 125, so that it is possible to prevent the excessive tension from being applied to the resin coated optical fibers 112.

Like this, it is possible to suppress the external force from being applied to the resin coated optical fibers 112 as much as possible, thereby keeping the favorable transmission characteristics.

In particular, since the tension members 125 are accommodated in the gap of the protection tube 113 in the accommodation density of 5800 denier/mm$^2$ or greater, it is possible to securely reinforce the resin coated optical fibers 112 in the protection tube 113 by the tension members 125.

In addition, not only the tension members 125 but also the fillers 126 are accommodated in the gap of the protection tube 113 and the accommodation density of the tension members 125 and the fillers 126 with respect to the gap is made to be 7500 denier/mm$^2$ or greater, so that it is possible to reinforce the resin coated optical fibers 112 in the protection tube 113 more securely.

In the above illustrative embodiment, the eight resin coated optical fibers 113 are accommodated in the protection tube 113. However, the number of the resin coated optical fibers 112 is not limited to eight. When the five or more resin coated optical fibers 112 are provided and all the resin coated optical fibers 112 are inscribed in the protection tube 113, the gap is formed at the central part of the protection tube 113. By inserting the tension members 125 into the gap in the protection tube 113, the resin coated optical fibers 112 are sandwiched by the protection tube 113 and the tension members 125 and thus position-fixed, so that it is possible to suppress the resin coated optical fibers 112 from being bent beyond necessity and thus the transmission loss from being increased. In addition, since the tension members 125 absorb the tension due to the bending of the cable and the like, the excessive tension is not applied to the resin coated optical fibers 112, so that it is possible to suppress the transmission loss of the resin coated optical fibers 112 from being increased.

Although the example is shown in which the resin coated optical fibers 112 are disposed at the sectional center of the opto-electro hybrid cable 111, the resin coated optical fibers 112 may be disposed at positions that are somewhat offset from the sectional center of the opto-electro hybrid cable 111.

The number, thickness and types of the electronic wires 115 are not limited to the above illustrative embodiment.

First Illustrative Example

Regarding the first aspect, a variety of opto-electro hybrid cables were prepared and the transmission loss of the resin coated optical fibers of the respective opto-electro hybrid cables was assessed by the insertion loss method.

(1) Assessment Method

Connectors are connected to both ends of the opto-electro hybrid cable having a length of 2 m. One connector is connected to a power meter and the other connector is connected to a light transmitting apparatus. The light is transmitted from the light transmitting apparatus, so that the emitting power Po from the resin coated optical fibers is measured at the measurement wavelength of 850 nm by the power meter. Based on the measured emitting power Po, the incident power Pi incident on the resin coated optical fibers and the length L of the opto-electro hybrid cable, the transmission loss α of the resin coated optical fibers including the loss in the connectors is calculated by a following equation.

$$\alpha = (Pi - Po)/L$$

By the above insertion loss method, the transmission loss α1 of the resin coated optical fibers is calculated with the opto-electro hybrid cable being straight. Then, the transmission loss α2 of the resin coated optical fibers including the loss in the connectors is calculated with the central part of the opto-electro hybrid cable being wound ten turns on a mandrel having a diameter of about 4 mm.

A difference (α2−α1) between the transmission loss α2, which is calculated with the opto-electro hybrid cable being wound, and the transmission loss α1, which is calculated with the opto-electro hybrid cable being straight, is considered as an increase amount in the transmission loss. When the increase amount in the transmission loss is 1 dB/10 turns or smaller, it is considered as pass (○) and when the increase amount in the transmission loss exceeds 1 dB/10 turns, it is considered as failure (x).

(2) Opto-Electro Hybrid Cable of Assessment Object

The opto-electro hybrid cables for USB cable having an outer diameter of about 3.0 mm of illustrative examples 1 and 2 and a comparative example 1 were prepared in which a plurality of resin coated optical fibers made of hard plastic clad fiber (H-PCF) and having an outer diameter of about 0.25 mm was accommodated in the protection tube and the electronic wires and the tensile strength members were accommodated between the protection tube and the sheath, like the above illustrative embodiments. In the illustrative examples 1 and 2 and the comparative example 1, the protection tubes and the inner structures thereof were different.

Illustrative Example 1

In the protection tube having Shore D hardness of 70, an inner diameter of about 0.54 mm and a thickness of about 0.23 mm and made of tetrafluoroethylene-ethylene copolymer (ETFE) resin, the three resin coated optical fibers were circumferentially disposed to abut on the inner circumference thereof.

Illustrative Example 2

In the protection tube having Shore D hardness of 65, an inner diameter of about 0.50 mm and a thickness of about 0.25 mm and made of tetrafluoroethylene-ethylene copolymer (ETFE) resin, the two resin coated optical fibers were circumferentially disposed to abut on the inner circumference thereof.

Comparative Example 1

In the protection tube having Shore D hardness of 50, an inner diameter of about 0.54 mm and a thickness of about 0.23 mm and made of polyvinyl chloride (PVC), the three resin coated optical fibers were circumferentially disposed to abut on the inner circumference thereof.

(3) Assessment Result

As shown in a table 1, in the illustrative examples 1 and 2 in which the protection tubes having Shore D hardness of 65 or greater were used, the increase amount in the transmission loss of the resin coated optical fiber was 1 dB/10 turns or smaller, so that it passed the assessment (loss of the resin coated optical fiber: ○). Compared to this, in the comparative example 1 in which the protection tube having Shore D hardness of 50 was used, the increase amount in the transmission loss of the resin coated optical fiber exceeded 1 dB/10 turns, so that it failed to pass the assessment (loss of the resin coated optical fiber: x).

TABLE 1

|  | Illustrative Example 1 | Illustrative Example 2 | Comparative Example 1 |
| --- | --- | --- | --- |
| Material of protection tube | ETFE | ETFE | PVC |
| Hardness of protection tube | 70 | 65 | 50 |
| Inner diameter of protection tube | 0.54 mm | 0.50 mm | 0.54 mm |
| Thickness of protection tube | 0.23 mm | 0.25 mm | 0.23 mm |
| The number of resin coated optical fibers | 3 | 2 | 3 |
| Loss of resin coated optical fibers | ○ | ○ | x |

Like this, the following are noted. In the illustrative examples 1 and 2, the resin coated optical fibers were protected by the protection tube having Shore D hardness of 65 or greater. Accordingly, it was possible to prevent the excessive lateral pressure from being applied to the resin coated optical fibers from the electronic wires and the like and the excessive bending or twisting from being generated. In addition, the tensile strength was also increased, so that it was possible to prevent the excessive tension from being applied to the resin coated optical fibers. As a result, the transmission loss was not increased even at the wound state.

Compared to this, the following are noted. In the comparative example 1, since the Shore D hardness of the protection tube protecting the resin coated optical fibers was 50 that is below 65, it was not possible to sufficiently prevent the excessive lateral pressure from being applied to the resin coated optical fibers from the electronic wires and the like and the excessive bending or twisting from being generated. In addition, the excessive tension was applied to the resin coated optical fibers. As a result, the transmission loss was increased.

Second Illustrative Example

Regarding the second aspect, a variety of opto-electro hybrid cables were prepared and the transmission loss of the resin coated optical fibers of the respective opto-electro hybrid cables was assessed by the insertion loss method.
(1) Assessment Method
Except for the following, the assessment method is the same as that of the first illustrative example.
(i) A length of the opto-electro hybrid cable was 50 m.
(ii) A diameter of the mandrel was 30 mm.
(iii) A case where the increase amount in the transmission loss was 0.2 dB/10 turns or smaller was indicated with ⊚.
(2) Opto-electro Hybrid Cable of Assessment Object
The opto-electro hybrid cables having an outer diameter of about 7.0 mm of illustrative examples 1 to 3 and a comparative example 1 were prepared in which eight resin coated optical fibers including core and clad made of glass and having an outer diameter of about 0.25 mm were accommodated in the protection tube and the electronic wires were accommodated between the protection tube and the sheath, like the above illustrative embodiments. In the illustrative examples 3 and 4 and the comparative example 2, the protection tubes and the inner structures thereof were different.

Illustrative Example 3

In the protection tube having Shore D hardness of 65, an inner diameter of about 0.9 mm and a thickness of about 0.6 mm and made of tetrafluoroethylene-ethylene copolymer (ETFE) resin, the eight resin coated optical fibers were circumferentially disposed to abut on the inner circumference thereof. In the gap of the protection tube, the tension members made of aramid fiber having 1420 denier and the fillers made of nylon fiber having 420 denier were accommodated.

Illustrative Example 4

In the protection tube having Shore D hardness of 65, an inner diameter of about 0.9 mm and a thickness of about 0.05 mm and made of tetrafluoroethylene-ethylene copolymer (ETFE) resin, the eight resin coated optical fibers were circumferentially disposed to abut on the inner circumference thereof. In the gap of the protection tube, the tension members made of aramid fiber having 1420 denier were accommodated.

Comparative Example 2

In the protection tube having Shore D hardness of 50, an inner diameter of about 0.9 mm and a thickness of about 0.6 mm and made of polyvinyl chloride (PVC), the eight resin coated optical fibers having an outer diameter of about 0.25 mm were circumferentially disposed to abut on the inner circumference thereof. In the gap of the protection tube, any of the tension members and the fillers was not accommodated.

As shown in a table 2, in the illustrative examples 3 and 4 in which the tension members made of aramid fiber were accommodated in the protection tube, the increase amount in the transmission loss of the resin coated optical fibers was 1 dB/10 turns or smaller, so that it passed the assessment (loss of the resin coated optical fiber: ○ or ⊚). Compared to this, in the comparative example 2 in which any of the tension members and the fillers was not accommodated, the increase amount in the transmission loss of the resin coated optical fiber exceeded 1 dB/10 turns, so that it failed to pass the assessment (loss of the resin coated optical fiber: x).

TABLE 2

|  | Illustrative Example 3 | Illustrative Example 4 | Comparative Example 2 |
|---|---|---|---|
| Material of protection tube | ETFE | ETFE | PVC |
| Hardness of protection tube | 60 | 65 | 50 |
| Inner diameter of protection tube | 0.9 mm | 0.9 mm | 0.9 mm |
| Thickness of protection tube | 0.05 mm | 0.05 mm | 0.6 mm |
| Material of tension member | Aramid | Aramid | — |
| Amount of tension member | 1420 D | 1420 D | — |
| Material of filler | Nylon | — | — |
| Amount of filler | 420 D | — | — |
| Loss of resin coated optical fibers | ⊚ | ○ | X |

When comparing the illustrative examples 3 and 4, it can be seen that the increase amount in the transmission loss due to the bending is further reduced by inserting the fillers.

Like this, the following are noted. In the illustrative examples 3 and 4, the resin coated optical fibers in the protection tube were protected by the protection tube and the tension members. Accordingly, it was possible to prevent the excessive lateral pressure from being applied to the resin coated optical fibers from the electronic wires and the like and the excessive bending or twisting from being generated. In addition, the tensile strength was also increased by the tension members, so that it was possible to prevent the excessive tension from being applied to the resin coated optical fibers. As a result, the transmission loss was not increased even at the wound state.

In contrast, in the comparative example 2, although the resin coated optical fibers were accommodated and protected in the protection tube, it was not possible to sufficiently prevent the excessive lateral pressure from being applied to the resin coated optical fibers from the electronic wires and the like and the excessive bending or twisting from being generated. In addition, since the excessive tension was applied to the resin coated optical fibers, the transmission loss was increased.

The invention claimed is:
1. An opto-electro hybrid cable comprising:
a plurality of optical fibers; and
a plurality of electronic wires inside a sheath;
the plurality of optical fibers being accommodated in a resin tube having Shore D hardness of 65 or greater;
the plurality of optical fibers being circumferentially disposed to abut on an inner circumference of the tube;
the plurality of electronic wires including insulated wires or coaxial cables and being disposed to abut on an outer surface of the tube around the plurality of optical fibers; and
the opto-electric hybrid cable being able to be wound ten turns of a mandrel having a diameter of 30 mm.
2. The opto-electro hybrid cable according to claim 1, wherein
the tube has a thickness of 0.05 mm or larger.

3. The opto-electro hybrid cable according to claim 1, wherein
tension members are disposed in a space formed at a central part in the tube.

4. The opto-electro hybrid cable according to claim 3, wherein
the tension members are accommodated in an accommodation density of 5800 denier/mm$^2$ or greater.

5. The opto-electro hybrid cable according to claim 4, wherein
filler is accommodated together with the tension members; and
an accommodation density of the tension members and the filler is 7500 denier/mm$^2$ or greater.

6. The opto-electro hybrid cable according to claim 1, wherein
the tube is formed of tetrafluoroethylene-ethylene copolymer resin.

7. The opto-electro hybrid cable according to claim 2, wherein
the tube is formed of tetrafluoroethylene-ethylene copolymer resin.

8. The opto-electro hybrid cable according to claim 3, wherein
the tube is formed of tetrafluoroethylene-ethylene copolymer resin.

9. The opto-electro hybrid cable according to claim 4, wherein
the tube is formed of tetrafluoroethylene-ethylene copolymer resin.

10. The opto-electro hybrid cable according to claim 5, wherein
the tube is formed of tetrafluoroethylene-ethylene copolymer resin.

* * * * *